United States Patent [19]

LaBelle et al.

[11] 4,412,033

[45] Oct. 25, 1983

[54] ONE-PART, CURABLE POLYURETHANE

[75] Inventors: Stanley B. LaBelle, Anoka; James A. E. Hagquist, St. Paul, both of Minn.

[73] Assignee: H. B. Fuller Company, St. Paul, Minn.

[21] Appl. No.: 417,021

[22] Filed: Sep. 13, 1982

Related U.S. Application Data

[63] Continuation of Ser. No. 200,572, Oct. 24, 1980, abandoned.

[51] Int. Cl.³ .............................................. C08G 18/10
[52] U.S. Cl. .................... 524/590; 156/307.3; 156/331.4; 427/388.2; 428/425.8; 528/55; 528/56; 528/58; 528/60
[58] Field of Search ............... 156/307.3, 331; 427/388.2; 428/425.8; 528/55, 56, 58, 60; 524/590

[56] References Cited

U.S. PATENT DOCUMENTS

| | | | |
|---|---|---|---|
| 3,351,573 | 11/1967 | Skreckoski | 528/60 |
| 3,464,935 | 9/1969 | Sepkoski et al. | 528/60 |
| 3,488,302 | 1/1970 | Pyron | 528/306 |
| 3,549,569 | 12/1970 | Farah et al. | 528/60 |
| 3,691,135 | 9/1972 | Schulze | 528/75 |
| 3,725,355 | 4/1973 | Parrish et al. | 252/188.3 |
| 4,119,594 | 10/1978 | Jobst et al. | 528/60 |

*Primary Examiner*—Maurice J. Welsh
*Attorney, Agent, or Firm*—Merchant, Gould, Smith, Edell, Welter & Schmidt

[57] ABSTRACT

The disclosed one-part curable polyurethane prepolymer compositions comprise a continuous phase and, distributed uniformly through this phase, a discontinuous phase containing a polyol curing agent of the pentaerythritol type. At moderately elevated temperatures, the polyol phase begins to enter into a curing reaction which has a single exotherm peak. The prepolymers are made from aliphatic or cycloaliphatic polyisocyanates and polymeric polyols. The one-part curable system is stable for long periods at room temperature. The curable polyurethane systems can be used in adhesives, coatings, sealants, and similar applications.

34 Claims, No Drawings

ONE-PART, CURABLE POLYURETHANE

This is a continuation, of application Ser. No. 200,572, filed Oct. 24, 1980 and now abandoned.

TECHNICAL FIELD

This invention relates to one-part, generally isocyanate-capped prepolymer compositions having a degree of stability at room temperature. An aspect of this invention relates to generally isocyanate-capped prepolymer compositions useful as adhesives, which compositions can be cured (chain-extended and/or cross-linked) by the application of modest amounts of heat. Still another aspect of this invention relates to one-part polyurethane adhesives having a lengthy pot life at room temperature, which adhesives can be cured by heating a film of adhesive (either directly or by heating the substrate on which it is coated) to a moderately elevated temperature. A further aspect of this invention relates to a method for making a heat-curable, one-part, generally isocyanate-capped prepolymer composition and methods for using such compositions—including methods for forming a cured polymer film and for bonding substrates together. A still further aspect of this invention relates to the cured polymer film or the bonded substrates produced by these methods.

DESCRIPTION OF THE PRIOR ART

The field of polyurethane chemistry has generally been an expanding one since the basic principles of prepolymer and polymer formation, modification, and curing were discovered a few decades ago. One of the first uses of polyurethane chemistry was in the manufacture of cellular or foamed polymers, but the early 1950's saw the beginning of a new era of polyurethane non-cellular elastomers. Part of the impetus for the expansion in this field of chemistry came from discoveries of more highly efficient catalysts such as the organometallic compounds which typically have a particularly strong accelerating effect upon the reaction between hydroxyl groups and isocyanate groups. Like other elastomers, those of the polyurethane type can be used in adhesives, coatings, and sealant technology. In these branches of polyurethane technology, as in elastomeric polyurethane technology generally, it is convenient to utilize a prepolymer system which can be cured to a higher molecular weight material. Typical prepolymers comprise a chain of repeating units terminated at its ends with moieties containing unreacted isocyanate groups. Such prepolymers, when reacted with a crosslinking or chain-extending agent can be at least doubled in molecular weight, and oftentimes the increase in molecular weight considerably exceeds a doubling. The crosslinking or chain-extending agent can itself contain repeating units. Alternatively, it can be a polyfunctional monomer. (Monofunctional reactants are considered chain-terminating rather than chain-extending or crosslinking in their contribution to the ultimately-obtained polymer structure.)

One very commonly used chain-extending and/or crosslinking monomer is water or water vapor. (Some crosslinking can result from water/NCO reactions through the formation of biuret linkages.) Many so-called one-part curable polyurethanes are actually moisture-curable. They are, in a sense, two-part systems in that the second "part" of the polyurethane or polyurea-forming system is not present in the prepolymer composition but is supplied by the environment when the first "part" is coated onto a substrate or exposed to the humidity which is present under normal ambient atmospheric conditions. One-part curable polyurethane systems having the second "part" built in in latent form are rather less common. Theoretically, any two-part curable polymer-forming system can be formulated as a one-part system if some technique can be found for causing the second part to be latent under normal ambient conditions. When this latent curing approach is used, perhaps one of the most typical means for activating the latent co-reactant is the application of heat. This technique is particularly advantageous in the field of epoxy chemistry, since there can be a range of temperatures wherein the epoxide or oxirane ring will be relatively inactive.

The heat-curing technique is somewhat more difficult to utilize in the field of polyurethane or polyisocyanate chemistry, due to the reactivity of the —NCO radical at modest temperatures. This reactivity is very often observed in the case of aromatic isocyanates (i.e. those isocyanates wherein the —NCO radical is substituted directly on an aromatic ring), but less so in the case of aliphatic and cycloaliphatic polyisocyanates. Isocyanates of the xylylene type tend to be intermediate in reactivity between the aromatics and the aliphatics or cycloaliphatics.

Even in those cases wherein there is very little tendency for the —NCO radicals to react with active-hydrogen containing coreactants at room temperature, the presence of catalysts such as tertiary amines, organometallic compounds, and the like can add to the complexity of formulating one-part, heat-curable prepolymer systems having the polyfunctional chain-extending and/or crosslinking agent "built in" to the composition.

The organometallic catalysts used in polyurethane chemistry typically have the ability to accelerate a polyol/polyisocyanate reaction at room temperature, and it would normally be expected that if a monomeric polyfunctional alcohol were in intimate contact with a polyisocyanate at room temperature in the presence of an organometallic catalyst, the resulting system would not have latent-curing properties. On the contrary, it would be the normal expectation that the viscosity of the system would increase fairly rapidly with time and perhaps even reach the point of gelation within a few hours.

One commonly used technique for avoiding gelation during storage is to "block" the terminal —NCO radicals of the prepolymer with a removable monofunctional capping agent such as phenol. Phenol reacts fairly readily with isocyanate groups, forming a urethane (—NH—CO—O—) linkage, but the reaction is reversible, particularly at moderately elevated temperatures. An interesting and potentially troublesome phenomenon occurs as a result of the unblocking step, however. The heat evolution pattern (the exotherm) of the polyurethane system during the curing stage is observed to be complex, often with at least two exotherm peaks. (Once the unblocking of the prepolymer has occurred, the reaction between the free —NCO and free hydroxyl is exothermic.)

Absent the blocking of the —NCO with phenol or other heat-removable capping agents, one might expect a polyether or ester-modified polyether polyol, an isocyanate-containing prepolymer, an organometallic catalyst, and a polyhydroxyl crosslinker-extender compound such as glycerin or pentaerythritol to provide a rapid-setting elastomer; see U.S. Pat. No. 3,725,355 (Parrish et al), issued Apr. 3, 1973. However, it is known that solid monomeric polyols, under appropriate conditions, can be introduced into one-part prepolymer systems to obtain relatively slow-curing or even stable mixtures. See U.S. Pat. No. 3,488,302 (Pyron), issued Jan. 6, 1970. The relatively stable mixtures of isocyanate prepolymer and solid polyol described in the U.S. Pat. No. 3,488,302 are said to be useful as caulks and sealants and can be applied as ribbons or coatings. Through the use of heat curing, these mixtures are firmly bonded to the surfaces to which they have been applied. In the heat-curing step, the curing temperature is said to be below the melting point of the solid polyol present in the mixture.

It is difficult to provide even a representative sampling of references drawn from the field of polyurethane prepolymer chemistry, this field being so vast and so highly developed. The following references, all U.S. patents, are believed to be representative.

| U.S. Pat. No. | Patentee | Issue Date |
|---|---|---|
| 3,351,573 | Skreckoski | November 7, 1967 |
| 3,488,302 | Pyron | January 6, 1970 |
| 3,549,569 | Farah et al | December 22, 1970 |
| 3,691,135 | Schulze et al | September 12, 1972 |
| 3,725,355 | Parrish et al | April 3, 1973 |

SUMMARY OF THE INVENTION

It has now been discovered that a one-part, generally isocyanate-capped prepolymer composition of unusual stability and highly desirable adhesive and exotherm-evolution properties can be prepared from a generally aliphatic or cycloaliphatic isocyanate-capped prepolymer and a monomeric, dimeric, or trimeric polyol of the pentaerythritol type. The prepolymer composition is stable for at least about 48 hours at normal ambient temperature and pressure, more typically for several weeks or even months. The prepolymer composition is curable at temperatures above 60° C. (preferably above 85° C.). It is desirable that the cure temperature or cure temperature range be below the melting point of the pentaerythritol-type polyol. "Curing" is, in this context, a chain-extension and/or crosslinking reaction between free hydroxyls of the pentaerythritol-type polyol and the free —NCO of the isocyanate-capped prepolymer, resulting in at least a doubling of the molecular weight of the prepolymer, more typically a very large increase in molecular weight which results in the formation of a solid polymer or resin which is typically noncellular in nature.

A one-part composition of this invention comprises:
(a) in a generally continuous phase, a generally aliphatic or cycloaliphatic isocyanate-capped prepolymer which is fluid at temperatures above 60° C., has a molecular weight in excess of 250, and contains a chain of repeating units selected from the group consisting of oxyalkylene, ester, or mixtures thereof; and uniformly distributed through this generally continuous phase,
(b) a phase comprising a solid, finely divided polyol of the formula

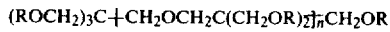

wherein
R represents hydrogen or an aliphatic, cycloaliphatic or aromatic radical, provided that more than one of the R groups is hydrogen, and
n is a number ranging from zero to two;
this polyol being at least partially incompatible with the prepolymer at temperatures below about 60° C.; and
(c) distributed through the generally continuous phase, an organometallic or metal salt catalyst for the reaction between isocyanate radicals and the free hydroxyl groups of the aforementioned (b) component.

The preferred polyisocyanate capping agents have —NCO substituents of unequal reactivity. A good example of such a diisocyanate is isophorone diisocyanate (IPDI). The preferred polymeric polyol capped by the diisocyanate is a polyester diol, triol, or tetrol, triols being particularly preferred.

Prepolymer compositions of this invention are made by capping the [polymeric polyol] with the aliphatic or cycloaliphatic polyisocyanate at an NCO/OH ratio within the range of about 0.8 to about 3:1, more preferably above about 2:1, thereby obtaining a generally isocyanate-capped prepolymer which is fluid or extrudible at normal ambient temperatures. The monomeric, dimeric, or trimeric polyol is uniformly distributed through the generally continuous phase containing the prepolymer. Since this dispersed or suspended phase is a solid, it is introduced in finely divided form and is preferably blended with a plasticizer which is inert toward hydroxyl and isocyanate groups. A water-binding agent can be added to this plasticizer.

Prepolymer compositions of this invention can be coated onto a substrate and cured by heating, as described previously. Since the prepolymer compositions (which are preferably very low in solvent and may be essentially "100% solids" compositions) have excellent adhesive properties when cured, they can be used to bond substrates together.

The prepolymer compositions can contain viscosity-adjusting agents such as thickeners and thixotropes. Some thickening is particularly desirable to add body to the compositions, so that they can be dispensed from a caulking or adhesive-dispensing gun which forces the composition through a small orifice, resulting in the formation of a ribbon or "bead" of the material.

DETAILED DESCRIPTION

Throughout the specification and claims of this application, the terms set forth below have the indicated meanings.

"Active hydrogen" is considered to be defined according to the Zerewitinoff test described in J. Amer. Chem. Soc. 49:3181 (1927). A typical example of an "active hydrogen" atom is the hydrogen in the hydroxyl radicals of mono- or poly-functional alcohols. Such "active hydrogen" is preferred in the context of this invention, although mercaptans, amines, acids, and the like are known to contain "active hydrogen".

"Aliphatic polyisocyanates" includes any polyisocyanate which has at least one —NCO radical attached to an alicyclic aliphatic group. The preferred "aliphatic polyisocyanates" of this invention are non-aromatic and thus contain no —NCO radicals attached to aromatic groups; however, it is both permissible and preferable for an —NCO of the "aliphatic polyisocyanate" to be attached to a cycloaliphatic radical.

"Cycloaliphatic polyisocyanates" includes and polyisocyanate which includes at least one —NCO radical attached directly to a cycloaliphatic group. The preferred "cycloaliphatic polyisocyanates" are non-aromatic in the sense described previously. "IPDI" refers to isophorone diisocyanate, also known as 3-isocyanatomethyl-3,5,5-trimethylcyclohexyl isocyanate.

"Percent solids" is a term borrowed from paint chemistry and polyester resin coating technology. The term refers to the amount of material (be it solid or liquid) remaining after volatile materials or materials not participating in the curing of the composition are removed. Thus, for example, a polyurethane prepolymer composition which was 85% prepolymer, 5% pigment, and 10% organic solvent would be characterized as a "90% solids" composition. Typical plasticizers, as opposed to solvents, would be included in the "solids" because of their substantially non-volatile nature. Furthermore, the plasticizer can normally be considered to form a part of the solid elastomeric or resinous system formed upon curing of the prepolymer with the dispersed or suspended solid polyol phase.

"Uniformly distributed" refers to discontinuous phases which are dispersed or suspended throughout a generally continuous phase, the degree of suspension or dispersion and the degree of uniformity being sufficient to prevent substantial settling of the discontinuous phase under normal ambient conditions.

As will be apparent from the foregoing summary description of this invention, a key aspect of the invention relates to the combination of a generally continuous phase comprising an isocyanate-terminated prepolymer with a second phase comprising a solid, finely divided polyol curing agent. This second phase is not readily soluble in the generally continuous phase, but is nevertheless uniformly distributed through the continuous phase so as to be in intimate contact with the prepolymer. Upon heating to a temperature above 60° C., preferably at least 85° C., the curing reaction is started and proceeds exothermically until completion, at which time a solid polyurethane polymer or resin is obtained. By varying NCO/OH ratios, functionalities of the starting materials, and the like, the properties of the ultimately obtained polyurethane prepolymer can be varied in accordance with principles known in the art. For example, relatively high NCO/OH ratios tend to provide resins with adhesive properties. When the NCO/OH ratio is less than 1:1, polymers can be obtained with a significant degree of hydroxyl-termination and relatively low molecular weights. When the NCO/OH ratio approaches 1:1, a significant amount of linear chain extension can occur, thereby providing a degree of thermoplastic (as opposed to thermoset) behavior and, with appropriately selected polymeric polyol starting materials for the prepolymer, a degree of elastomeric behavior. This invention contemplates one-part curable polyurethane compositions which can be cured either to highly crosslinked adhesives or relatively elastomeric compositions having low to moderate crosslink densities.

Like other types of resins, highly crosslinked cured polyurethanes made according to this invention can be plasticized. The uncured one-part polyurethane prepolymer systems can thus be blended with plasticizers and other modifiers which do not necessarily enter into reactions with isocyanate or hydroxyl groups. Indeed, it is preferred that the plasticizer be substantially inert toward these groups. Similarly, if viscosity modifiers are added, it is ordinarily preferred that these ingredients be relatively inert during the NCO/OH reaction. The plasticizers can also have a viscosity-modifying effect and are preferably, for all practical purposes, insoluble in water. High-boiling hydrocarbons such as the hydrogenated polynuclear aromatics are particularly useful as plasticizers in this invention. To provide thickening or thixotropic effects to make the one-part polyurethane better suited for use as a caulk, sealant, non-sagging coating, adhesive, or the like, conventional organic and inorganic thickeners and/or thixotropes can be added, thereby raising the viscosity or the shear-dependent viscosity. Organic thickening agents and thixotropes which are inert toward isocyanate and hydroxyl groups are not always easy to find, however. Even inorganic thickeners and thixotropes can have isocyanate-reactive groups, e.g. silanol (SiOH). Techniques for masking silanol groups on finely divided silica, silicates such as the hydrated magnesium aluminum silicates, and the like are well known. For example, the silica or silicate particles can be treated with silicones, wih reactive silicon-containing monomers, or with other hydroxide-reactive or silanol-compatible compounds to eliminate or significantly reduce the availability of the silanol groups at the surface of the silica or silicate particles. Despite such treatments, the silica or silicate particles retain some thickening or thixotropic effects. The "ultimate" particle size of these inorganic agents is generally in the colloidal range—typically larger than a nanometer but smaller than a micrometer. These colloidal particles have a strong tendency to clump together to form agglomerates or other enlarged, porous particles with a high surface area per unit weight. Silicone-modified hydrophobic silicas are the agents generally preferred for adding body (or false body) to the one-part polyurethane compositions of this invention. (The term "silicone" is synonymous with organopolysiloxane polymers.)

The preferred isocyanate-terminated polyurethane prepolymers of this invention are derived from polymeric polyol and aliphatic or cycloaliphatic polyisocyanate starting materials, which starting materials will now be described in greater detail.

THE POLYMERIC POLYOL

Suitable polymeric polyols are preferably fluid at normal ambient temperatures and have a molecular weight in excess of 250, more typically in excess of 500. A chain of repeating oxyalkylene and/or ester units makes a major contribution to the molecular weight. A typical polymeric polyol consists essentially of either a linear or branched chain of the repeating units which is terminated with hydroxyl groups, and, for the sake of simplicity, these hydroxyl groups will normally be the only active hydrogen-containing substituents in the polyol structure. Polyester and polyether polyols having molecular weights in the hundreds of thousands and even the millions are commercially available, but the viscosity of the resulting prepolymer system is more likely to be manageable when synthesized from polymeric polyols having a molecular weight less than 20,000, more typically less than 5,000 or 10,000, the optimum range being about 500 to about 3,000. The functionality of the polymeric polyol can be varied over a wide range by selecting a monomeric polyol nucleus or other active hydrogen-containing nucleus having the desired number of active hydrogen atoms or active hydrogen-containing substituents. For example, a polymeric polyol having a functionality of three can be "grown" from an initiator or nucleus such as glycerin, trimethylolpropane, triethanolamine, and similar monomeric triols. (If the desired functionality is only two, the initiator or nucleus can be water, a glycol, or the like.) For a polymeric polyol functionality of four, ethylene diamine and other di-primary amines have been used successfully, since the two active hydrogens on each amine substituent are of substantially equal reactivity. Carbohydrates or carbohydrate derivatives having very few (or only one) saccharide or saccharide-like units can be used to provide an initiator with a very high functionality, e.g. up to about eight. Hydroxide-containing oils (vegetable oils, etc.) have also been used to provide polyols of high functionality. Thus, after the polyol has been reacted with the polyisocyanate, the resulting prepolymer can have an isocyanate functionality greater than one and ranging up to three or four or even six, but typically not more than nine. The preferred polyoxyalkylene or polyester-containing polyols of this invention will thus normally be diols, triols, or tetrols. The equivalent weights of these preferred polymeric polyols will typically range from about 125 to about 2,500, the 200–1,000 range being generally considered to have optimum properties for an adhesive system. Polyester polyols having a functionality greater than two are particularly useful in adhesive systems. Poly(epsilon-caprolactone) polyols of various functionalities and equivalent weights are readily available and are well suited to use in this invention. Among the commercially available embodiments of these polyols is the "NIAX Polyol PCP" series, which melt at temperatures below 60° C., more typically at temperatures below 40° C. Average hydroxyl numbers for this series of polyols can range from as low as 37 to as high as 560, indicating equivalent weights as high as about 1,520 and as low as about 100. Average formula molecular weights of this series of polyols is reported to range from as low as 300 to as high as 3,000. All of these polyols do not work in this invention with equal effectiveness, and those having an average molecular weight above 500 and an average hydroxyl number below about 450 are most advantageous.

THE POLYISOCYANATE-CAPPING AGENT

The polymeric polyols described previously are capped with a polyisocyanate to form the isocyanate-terminated polyurethane prepolymer. To provide a one-part, curable polyurethane prepolymer system with the desired degree of stability at room temperature, the capping agent should be an aliphatic or cycloaliphatic polyisocyanate typically having a functionality greater than 1 but less than 4. Aliphatic and cycloaliphatic di- and triisocyanates are commercially available, the most common of these compounds being the diisocyanates such as the alkylene diisocyanates, IPDI, and hydrogenated aromatic and xylylene-type diisocyanates. As noted previously, the preferred "aliphatic polyisocyanates" and "cycloaliphatic polyisocyanates" of this invention are non-aromatic, hence any aromatic rings originally present in the starting material have been partially or fully hydrogenated. However, as is known in the art, polynuclear polyisocyanates can be selectively hydrogenated, so that one ring becomes cycloaliphatic while the other remains aromatic. As aromatic/cycloaliphatic diisocyanates, such compounds react far more readily with hydroxyl groups at the aromatic end of the molecule, generally resulting in an isocyanate-terminated prepolymer in which the free —NCO groups are virtually all attached to the cycloaliphatic end of the capping agent. As a result, the prepolymer can be expected to behave as a cycloaliphatic isocyanate-capped material which is virtually free of aromatic isocyanate character. The reaction kinetics governing the formation of the prepolymer will generally favor such a result, but, because of the statistical possibility of free aromatic isocyanate, totally non-aromatic polyisocyanates are the generally preferred capping agents.

Non-aromatic polyisocyanates do not have to have symmetrical structures or —NCO groups of equal reactivity to be useful in this invention. Indeed, IPDI is the preferred polyisocyanate, and the —NCO groups of this compound are not of equal reactivity. One of the —NCO's is attached directly to a cycloaliphatic ring, while the other is "insulated" from the ring by a methylene group. Although this invention is not bound by any theory, it is believed that a polyurethane prepolymer of this invention will generally be terminated with the less reactive of the two —NCO radicals of the IPDI molecule—a result which will probably be favored by the kinetics prevailing during the formation of the prepolymer. These relatively slow-reacting terminal isocyanate groups may contribute to the surprising room temperature stability of one-part curable polyurethane systems of this invention. Again, this invention is not bound by any theory, but another possible contributing factor is the relative incompatibility of the solid, pentaerythritol-type curing agent uniformly distributed through the uncured prepolymer of the one-part system. Apparently, at temperatues above 60° C., more typically above 85° C., this incompatibility is significantly reduced, resulting in a long step toward a more homogeneous and, perhaps, more reactive system in which the slow-reacting free —NCO of the IPDI residue quickly becomes more able to react with the curing agent. The observed result is a curing reaction with a single exotherm peak.

For the capping step which forms the curable prepolymer, the NCO/OH ratio can vary over a wide range, depending upon the properties desired in the ultimately obtained polymer. For a high level of chain extension and the possibility of elastomeric properties in the cured polymer, and NCO/OH ratio in the range of about 0.8 to about 1.2 is generally most effective. For a coating composition with some degree of elasticity, impact resistance, and stress-relieving properties, the NCO/OH ratio can be considerably higher, e.g. up to about 2:1. Adhesive systems can have even higher NCO/OH ratios and are typically above 2:1. In the context of this invention, there does not appear to be any advantage in a ratio about 3:1. Adequate rigidity, bond strength, and stress-relieving properties can be obtained with an NCO/OH ratio below 2.8:1.

The curing agent (which will be described in greater detail subsequently) is a polyhydric alcohol and thus lowers the overall NCO/OH ratio when it is added to the system. For example, the curing agent can be added in an amount sufficient to lower the NCO/OH ratio of the total composition by from 10 to 75%. When the NCO/OH ratio for the formation of the uncured prepolymer is greater than 1.5 (e.g. 2:1–3:1), the presence of the curing agent can reduce the NCO/OH ratio to less than 1.5, but the ratio will preferably remain greater than about 0.8. In adhesive systems of this invention, it is preferred that the overall NCO/OH ratio remain above 1:1, even after the addition of the curing agent.

THE CURING AGENT

The monomeric or substantially monomeric polyhydric alcohols used as curing agents in the dispersed or suspended phase of the one-part curable polyurethane systems of this invention are solids having melting points above the preferred curing temperatures. These curing temperatures are ordinarily well below 250° C., and are typically within the range of 85L°–200° C. For example, a so-called "spot-welding" cure is typically carried out for a few minutes (e.g 0.5–10 minutes) at 150°–190° C., the time and temperature being, of course, interrelated. Typical oven cures are carried out for longer times at still lower temperatures. As noted previously, no significant curing is observed at temperatures below 60° C., or even at temperatures as high as 85° C.

Pentaerythritol is an ideal polyhydric alcohol curing agent in the context of this invention. Its melting point has been variously reported at 260° C. and 262° C. It appears to have substantial incompatibility with uncured polyurethane prepolymers preferred for use in this invention. The hydroxyl groups of pentaerythritol do not appear to enter into a reaction with the free —NCO radicals of the IPDI residue at normal ambient temperatures and pressures, even in the presence of an organometallic catalyst.

Esterification of pentaerythritol, particularly with lower aliphatic acyl groups can significantly reduce the melting point of the resulting ester; hence, such esterification is ordinarily not desired. Furthermore, at least two hydroxyl groups of the pentaerythritol (or its dimer or trimer) should remain available for interaction with —NCO groups during the curing reaction. The unesterified dimer and trimer of pentaerythritol are both useful in this invention, however, since technical grade pentaerythritol can contain measurable amounts of these higher analogs. Of the two higher analogs, the dimer is believed to behave in a manner more similar to pentaerythritol itself. (The dimer, also referred to as dipentaerythritol is present in technical grade pentaerythritol in much larger quantities than the trimer, also called tripentaerythritol.) For these and other reasons, it is not necessary that the curing agent be pentaerythritol of greater-than-technical grade purity. Conversely, this invention is not limited to the use of technical grade pentaerythritol or its dimer or trimer. High purity pentaerythritol is commercially available and is used in large quantities to manufacture the explosive pentaerithrityl tetranitrate. If pentaerythritol esters or esters of its dimer or trimer are used as curing agents in this invention, up to two of the pentaerythritol methylol groups can be converted to —CH$_2$OR, wherein R represents an aliphatic, cycloaliphatic or aromatic acyl radical, preferably a radical which will not depress the melting point of the resulting ester to a temperature below 150° C. In the dimer, up to four methylol groups can be converted to ester groups without reducing the hydroxyl functionality below two—and this number increases to six in the case of the trimer. There does not appear to be any advantage to this high degree of esterification, however. Again, it should be borne in mind that the trimer is not as readily available as the dimer and is still less available as compared to pentaerythritol itself. Pentaerythritol is made commercially by a variety of relatively simple processes, including an aldol condensation/cross-Cannizarro reaction between acetaldehyde and four moles of formaldehyde. Dipentaerythritol is normally considered a by-product of such reactions, and it is difficult to attain much of the trimer by this route.

THE CURING CATALYST

To obtain the full benefit of a one-part curable polyurethane composition of this invention, it is preferred to include a catalyst for the reaction between isocyanate radicals and the free hydroxyl groups of the curing agent. As is known in the art, a variety of organometallic compounds and metal salts have the capability of speeding up the NCO/OH reaction. In fact, organomercury catalysts have been found to selectively accelerate the NCO/polyol reaction even in the presence of other active hydrogen-containing compounds such as water. Organometallic and metallic salt catalysts used in polyurethane chemistry typically contain metals or metallic ions from Groups VIII, I-B, II-B, and IV-A of the Periodical Table, e.g. tin, lead, iron, and mercury. Organometallic compounds of bismuth, titanium, antimony, uranium, cadmium, cobalt, thorium, aluminum, zinc, nickel, molybdenum, vanadium, copper, manganese, and zirconium have also been disclosed as useful catalyst materials; see, for example, U.S. Pat. No. 3,691,135 (Schulze et al), issued Sept. 12, 1972, column 3, line 35 et seq. The use of organotin compounds is particularly common, e.g. compounds having the structure $R_2SnX_2$, wherein R is a hydrocarbon radical, X is chlorine or an acyloxy, alkoxy, aryloxy, alkylthio or arylthio radical, or wherein $X_2$ represents an oxygen or sulphur atom. Compounds of the structure $R_3SnX$ have also been disclosed as having the desired catalytic activity. See, for example, U.S. Pat. No. 3,351,573 (Skreckoski), issued Nov. 7, 1967, column 4, line 12 et seq. Mercury salts such as mercuric acetate are known to have catalytic activity toward the NCO/OH reaction. These salts tend to be less effective in catalytic quantities, however, and molar quantities may be required. Compounds of the formula RHgX, wherein R is aliphatic, aromatic, or cycloaliphatic and X is OCOR' (R' being defined in the same manner, but not necessarily the same radical, as R) are highly effective in catalytic quantities and are among the preferred organometallic catalysts used in this invention. Typical catalytically effective amounts of organomercury compounds are in the range of 0.1–1% of the weight of the total one-part curable polyurethane system. Organotin compounds are typically effective in about the same amounts. There does not appear to be any advantage in using larger amounts of the more effective organometallic compounds, although, as noted earlier, metallic salts containing no direct carbon-metal bonds can be used advantageously in much larger amounts as compared to the organometallics.

OTHER INGREDIENTS

As is known in the art, fillers, extenders, pigments, and the like can be included in polyurethane prepolymer compositions. Neutral fillers are ordinarily preferred, since highly alkaline materials may have an undesired catalytic effect, and highly acidic materials may attack the urethane (carbamate) linkages in the prepolymer. As noted previously, it is preferred to include viscosity modifying agents in prepolymer compositions of this invention. For the sake of convenience of description, the plasticizer (e.g. hydrogenated terphenyl) and the thickener or thixotrope (e.g. silicone-modified hydrophobic silica) can be considered to be part of a viscosity modifying system, although each of these components can have other desired effects upon the prepolymer composition and the ultimately obtained cured product. Preferably, the viscosity modifying system is not a major component of the polyurethane prepolymer composition and may be omitted entirely, although at least about 1% by weight of plasticizer is a most useful aid for introducing and dispersing the solid curing agent phase of the one-part curable polyurethane composition. If the one-part polyurethane composition is to be used as an adhesive, caulk, sealant, or sag-resistant coating agent, at least about 1% by weight of the system will normally comprise the thickener or thixotrope. Normally, the amount of either plasticizer or thickener would not exceed about 25% by weight of the solids in the one-part curable system; indeed, the combined total of these two components will normally not exceed 25 or 35% by weight of the solids.

The plasticizer is typically introduced in two increments. A modest amount (e.g. 5–15% by weight of the total solids) can be blended with the isocyanate-capped prepolymer in the generally continuous phase. A smaller amount (e.g. 1–5% or more, depending upon the amount of curing agent used) is included in a pre-mix which becomes the discontinuous, curing agent-containing phase. Measured in terms of the amount of curing agent, this second portion of plasticizer will typically range from about 25 to about 150 parts per hundred by weight (phr). When organic water binding agents are used (e.g. the alkyl orthoformates) it is generally convenient to include this agent in the pre-mix. Very small amounts of alkyl orthoformate provide good protection against undesired side reactions with any trace amounts of water which may be present. Thus, less than 1 or 2% by weight of the total composition will typically comprise the water-binding agent. Some inorganic filler and the like can also bind water and thereby protect against carbon dioxide formation and other undesired side reactions. However, some of these inorganic agents (such as calcium oxide) are alkaline and are ordinarily not preferred.

PROCESSES OF MANUFACTURE AND USE

The formation of a polyurethane prepolymer from a polymeric polyol and a suitable isocyanate capping agent is carried out in accordance with principles well known in the art of polyurethane chemistry. Heat and/or catalysis can be used to accelerate the NCO/OH reaction. Introduction of the solid curing agent into the generally continuous phase provided by the prepolymer can be carried out with the aid of a pre-mixing step, as described previously. Blending of the two phases can be carried out with conventional mixing equipment. The same or similar equipment can be used to introduce the organometallic or metallic salt catalyst and the thickener or thixotrope, if any.

The amount of volatile solvent in the composition is preferably minimal, if any be present at all. When used, solvent is preferably introduced into the continuous phase up to a level of, for example, 25% by weight of the total composition. However, any solvent which would tend to reduce significantly the incompatibility relationship between the continuous phase and the dispersed or suspended solid curing agent phase could have a strong detrimental effect upon the stability of one-part systems of this invention. For this and other reasons, it is preferred to exclude solvent entirely from the composition, thereby providing a substantially 100% solids system. Plasticizers such as the hydrogenated aromatic compounds typically used in preferred compositions of this invention do not appear to have any adverse effect upon stability or upon the phase relationship described previously. Accordingly, if reductions in viscosity are desired, it is generally preferred to increase the amount of plasticizer rather than to introduce conventional polyurethane solvents such as acetone, alcohol, or the like. Hydrocarbon solvents such as mineral spirits are less likely to have such an adverse effect.

One-part polyurethane systems of this invention can be used in the same manner as other stable, one-part curable adhesives, coatings sealants, caulks, patching compounds, and moldable resin systems. Curing, as noted earlier, is initiated very simply through heating of the one-part system or its environment or the substrate on which it is coated.

As an adhesive, one-part polyurethane systems of this invention are particularly useful for bonding sheet molding compound (SMC) to itself and to aluminum or other metals. Good bond strength has also been obtained with aluminum-to-aluminum bonds. One-part curable systems of this invention can also be used to coat these substrates, e.g. as a protective or decorative coating. The cured polymer or bonds obtained with the cured polymer resist severe water immersion tests and meet industry bondstrength specifications when cured according to the teachings of this invention.

EXAMPLES

In these Examples the following trademarks or trade designations are used to identify the materials described below. "NIAX Polyol PCP-0310" is a polycaprolactone polyol which is essentially trifunctional and has an average formula molecular weight of 900, an apparent specific gravity (55/20° C.) of 1.073, an average hydroxyl number of 187 mg KOG/g, an acid number which does not exceed 0.25 mg KOH per gram of sample, a melting range of 27°–32° C., a water content at time of shipment which does not exceed 0.03% by weight, and a viscosity at 130° F. (54.4° C.) of 270 centistokes. In the molten state, the maximum color of this polyol is 100 (Pt-Co). "NIAX" is a trademark of Union Carbide Corporation. "HB-40" (trademark of Monsanto) is a highboiling hydrogenated aromatic which solvates a variety of polymers and rubbers as well as asphalts and tars. It is a clear, oily liquid with a maximum color (APHA) of 180, a maximum moisture content (KF in methanol) of 125 parts per million (ppm), a refractive index at 25° C. ranging from 1.560 to 1.575, a specific gravity (25°/15.5° C.) of 1.001–1.007, a pour point of −26° C., a boiling point of 180° C. at 10 mm of Hg, a surface tension at 25° C. of 40.1 dynes/cm, a flash point (C.O.C.) of 345° F. (173.9° C.), and a fire point (C.O.C.) of 385° F. (196° C.). Chemically, "HB-40" is hydrogenated terphenyl and is practically insoluble in water. Its vapor pressure in mm Hg at 150° C. is 2.6, at 200° C. is 22, and at 250° C. is 95. Its viscosity in centistokes is 70 at 0° C., at 37.8° C., and 3.8 at 98.9° C. "HB-40" has been used as a partial replacement for conventional vinyl resin plasticizers of the diester type.

"Additive OF" (trace designation of Mobay Chemical Company) is an alkyl orthoformate having a boiling point of about 293° F. (about 145° C.), a specific gravity at 20° C. of about 0.09, and a flash point (DIN 51755 Closed Cup) of 97° F. (36° C.). It is a water-white liquid which has been used by itself or in combination with other additives to stabilize one-component polyurethane coatings. According to the manufacturer's recommendations, 2-3% of this additive should be added for clear coatings. For pigmented coatings, 4-5% should be included. for two-component systems, 1% of Additive OF is recommended, based on total formulation weight. This additive is known to reduce the moisture sensitivity of polyurethane systems. "COCURE 32" (trademark of Cosan Chemical Corporation of Cliffton, N.J., U.S.A.) is a liquid organomercurial urethane catalyst for the isocyanate/hydroxyl reaction containing 60% active ingredient, 20% mercury calculated as metal. This liquid composition contains a non-reactive solvent system which is hydroxyl free. "COCURE 32" has been formulated to be compatible with both polyether and polyester polyols and with polymeric isocyanates.

"CAB-O-SIL TS-200" (trademark of the Cabot Corporation) is an inorganic fumed silica powder which has been modified by treatment with an organic silicone. The treated powder is generally hydrophobic. It has a surface area of 70 plus or minus 15 m²/g. It contains at least 99.8% silica and has a pH of approximately 4.7.

The IPDI (isophorone diisocyanate) used in these Examples was supplied by Veba-Chemie A.G. This compound is a low viscosity liquid with no tendency to crystallize at low storage temperatures. Due to its relatively high molecular weight, the vapor pressure is low: 0.0004 mbar at 20° C. and 0.009 mbar at 50° C. As the terminal residue of an isocyanate-capped prepolymer, the vapor pressure is, of course, further reduced, as is the odor. The molecular weight of the compound is 222.3, and the NCO equivalent weight is 111.1. The flash point (closed) is 155° C., and the autoignition temperature is 430° C. The minimum specified NCO content is 37.5% by weight; minimum specifed purity is 99.0 weight-%; and the specified density at 20° C. ranges from 1.058 to 1.064 g/ml. The total chlorine should not exceed 0.05 weight-%, and the maximum hydrolyzable chlorine should not exceed 0.02 weight-%. The melting point is approximately −60° C., and the boiling point at 13.33 mbar is 158° C. The viscosity should not exceed about 150 centipoise (cps) even at −20° C.

The pentaerythritol used in this Example is designated "PE-200" (trade designation of Hercules Incorporated) and is a high quality technical grade of this compound which has been ground to particle size sufficiently fine enough to pass a 200 mesh (U.S.) screen. Only about 1% or less of the particles are retained on a 325 U.S. mesh screen. The monopentaerythritol (C[CH$_2$OH]$_4$) is specified to be 88 plus or minus 2%, a fairly typical percentage for a technical grade. A major amount of the remaining 10-14% is believed to be dipentaerythritol. The specified hydroxyl content is 48 plus or minus 1%, and the ash content is less than 0.01%. Less than 0.5% of "PE-200" comprises liquid by-products or contaminants. The average equivalent weight for this technical grade of pentaerythritol is 35.4. (Other polypentaerythritols besides dipentaerythritol may be present.)

EXAMPLE 1

One-Part Curable Polyurethane Adhesive

This thixotropic adhesive has been found to be suitable for bonding polyester sheet molding compound (SMC) for automotive applications. The continuous phase of the one-part curable composition consists essentially of an IPDI-capped polycaprolactone triol blended with some plasticizer. The discontinuous phase is introduced in the form of a pre-mix containing technical grade pentaerythritol, plasticizer, and alkyl orthoformate. The composition also contains an organomercury catalyst and hydrophobic silica to impart the thixotropy. The ingredients of this one-part system containing a dispersed or suspended curing agent are listed in the order in which they are added.

| Ingredient | Amount (weight-%) |
|---|---|
| Polyurethane prepolymer derived from 53.0 wt.-% "NIAX Polyol PCP-0310" and 47.0% IPDI | 73.14 |
| "HB-40" (plasticizer) | 7.31 |
| Pre-mix | 7.8 |
| "COCURE 32" (catalyst) | 0.25 |
| "CAB-O-SIL TS-200" (thixotrope) | 11.5 |

The pre-mix contained the "PE-200" technical pentaerythritol, "HB-40" plastizier, and "Additive OF" in the ratio (by weight) of 59.75:39.4:0.85 (respectively).

EXAMPLE 2

Spot Welding and Oven Curing

The one-part curable composition of Example 1 was used to bond acid-etched aluminum to itself and aluminum to sheet-molding compound (SMC). Rockwell's SMC was used for these tests, and the adhesive coating thickness ranged from 10 to 15 mils (250-380 micrometers). Spot welding was simulated with a heated platten press.

On SMC/SMC bonds, the results were as follows.

| 1. Spot welding (platten press) - | |
|---|---|
| Curing Conditions (Temperature/Time) | Bond Strength at Substrate Failure* (psi) |
| 350° F./2 minutes | 751 |
| 350° F./3 minutes | 915 |
| 350° F./4 minutes | 859 |
| 350° F./5 minutes | 912 |

*In no case did the bond fail before substrate failure. These reported bond strengths exceed industry specifications by at least a factor of 10.

| 2. Oven curing - | |
|---|---|
| Two-Step (Temperature/Time) | Bond Strength at Substrate Failure** (psi) |
| Step 1: 260° F./ 30 minutes | 768 |
| Step 2: 330° F./ 30 minutes | 943 |

**Industry specifications are 100 psi after step 1 and 600 psi or SMC failure after step 2. SMC failure was observed after both curing steps.

| 3. Water immersion text - | |
|---|---|
| Water immersion or Humidity Treatment Time/Temperature | Bond Strength at Substrate Failure (psi) |
| 14 days immersion/ 75° F. | 675 |
| 14 days/200° F. | 657 |
| 14 days/100° F./ 100% relative | 688 |

-continued

| 3. Water immersion text - | |
|---|---|
| Water immersion or Humidity Treatment Time/Temperature | Bond Strength at Substrate Failure (psi) |
| humidity | |

Other tests were run for bonds between various substrates.

| Substrate/Substrate | Curing Conditions (Temperature/Time) | Bond Strength, Pulled at: Temperature | psi |
|---|---|---|---|
| acid-etched aluminum/ acid-etched aluminum | 260° F./30 minutes | room temperature (20-25° C.) | 2,477 |
| acid-etched aluminum/ acid-etched aluminum | 260° F./30 minutes | −40° C. | 3,392 |
| acid-etched aluminum/ acid-etched aluminum | 260° F./30 minutes | 50° C. | 1,634 |
| SMC/Aluminum | 260° F./30 minutes | 20-25° C. | 937* |
| SMC/Aluminum | Step 1: 260° F./30 minutes Step 2: 330° F./30 minutes | 20-25° C. | >1,000** |

*Adhesive bond failure
**SMC failure

What is claimed is:

1. A one-part, isocyanate-capped prepolymer composition stable for at least about 48 hours at normal ambient temperature and pressure and curable at temperatures above 60° C. to a solid polymer with at least twice the molecular weight of said prepolymer, said prepolymer composition comprising:
   (a) in a continuous phase, an aliphatic or cycloaliphatic polyisocyanate-capped prepolymer which is fluid at temperatures above 60° C., has a molecular weight in excess of 250, and contains a chain of repeating units selected from the group consisting of oxyalkylene, ester, or mixtures thereof; and, uniformly distributed through said continuous phase,
   (b) a phase comprising a solid, finely divided polyol of the formula

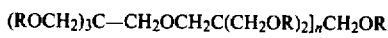
   $(ROCH_2)_3C—CH_2OCH_2C(CH_2OR)_2]_nCH_2OR$ wherein
   R represents hydrogen or an aliphatic, cycloaliphatic or aromatic acyl radical, provided that more than one of the R groups is hydrogen, and n is a number ranging from zero to two;
   said polyol being at least partially incompatible with said prepolymer at temperatures below about 60° C., wherein the presence of the solid finely divided polyol reduces the ratio of NCO groups to OH groups in the total composition from greater than 1.5:1 to about 0.8:1-1.5:1; and
   (c) distributed through said continuous phase, an organometallic or metal salt catalyst for the reaction between isocyanate radicals and the free hydroxyl groups of said component (b).

2. A composition according to claim 1 wherein said uniformly distributed phase consists essentially of the solid, finely divided polyol blended with a plasticizer which is essentially inert toward active hydrogen and isocyanate.

3. A composition according to claim 1 wherein said continuous phase is substantially solvent-free.

4. A composition according to claim 1 wherein:
   (a) said prepolymer is the reaction product of the components comprising an aliphatic or cycloaliphatic diisocyanate having —NCO radicals of unequal reactivity and a polyester or polyoxyalkylene reacted together at an NCO/OH ratio within the range of about 1.5:1 to about 3:1; and
   (b) said polyol is unesterified, unreacted pentaerythritol or dipentaerythritol.

5. A method according to claim 4 wherein said components of said prepolymer are reacted together at an NCO/OH ratio greater than about 2.0.

6. A one-part polyurethane adhesive curable with heat and having a pot life of more than 48 hours at normal ambient conditions, said adhesive comprising:
   (a) in a continuous, fluid phase containing less than 25 weight-% solvent, an isocyanate-capped prepolymer comprising a polyester polyol capped with an aliphatic or cycloaliphatic polyisocyanate, said prepolymer being fluid at 60° C., having an average molecular weight in excess of 500, and having an isocyanate functionality greater than 1 but less than 4;
   (b) a sufficient amount of solid particles of unreacted, monomeric or dimeric pentaerythritol or esters of pentaerythritol or its dimer having at least two free hydroxyl groups to reduce the ratio of NCO groups to OH groups in the total composition from greater than 1.5:1 to about 0.8:1-1.5:1, in a plasticized solid phase distributed through said continuous, fluid phase;
   (c) distributed through said continuous, fluid phase, an organometallic or metal salt catalyst for the reaction between isocyanate radicals and the free hydroxyl groups of said component (b).

7. An adhesive according to claim 6 wherein said polyester polyol is polycaprolactone glycol, triol or tetrol, and said pentaerythritol or its dimer is unesterified; said adhesive containing an organometallic catalyst for the NCO/OH reaction.

8. An adhesive according to claim 7 wherein the molecular weight of the polycaprolactone glycol, triol or tetrol is within the range of 500 to 5000.

9. An adhesive according to claim 7 wherein said aliphatic or cycloaliphatic polyisocyanate is a diisocyanate having one aliphatic —NCO and one cycloaliphatic —NCO.

10. A method for making a heat-curable, one-part, isocyanate-capped prepolymer comprising the steps of:
    (a) capping a polyoxyalkylene or polyester-containing polyol with an aliphatic or cycloaliphatic polyisocyanate at an NCO/OH ratio within the range of about 1.5:1 to about 3:1, thereby obtaining an isocyanate-capped prepolymer which is fluid at normal ambient temperatures;
    (b) uniformly distributing a finely divided solid polyol through said prepolymer in a sufficient amount to reduce the NCO/OH ratio of the total composition to about 0.8:1 to 1.5:1, said solid polyol being generally incompatible and unreactive with said prepolymer at temperatures below about 60° C., but relatively more reactive with said prepolymer at a range of temperatures above 60° C.

and below the decomposition temperature of the prepolymer, said solid polyol having the formula

wherein
R represents hydrogen or an aliphatic, cycloaliphatic or aromatic acyl radical, provided that more than one of the R groups is hydrogen, and n is a number ranging from zero to two.

11. A method according to claim 10 wherein said capping step is carried out with (1) a polyester or polyoxyalkylene polyol having a functionality greater than 1 but less than 9, and (2) an aliphatic or cycloaliphatic diisocyanate, wherein said solid polyol is unesterified pentaerythritol; and wherein said unesterified pentaerythritol is blended into said prepolymer with the aid of a liquid plasticizer which is essentially inert toward hydroxyl and isocyanate groups at the lowest curing temperature of said prepolymer.

12. A method for forming a cured polymer film comprising the steps of:
(a) coating the prepolymer composition of claim 1 onto a substrate; and
(b) heating the resulting coating on said substrate to a temperature above about 60° C.

13. A method for bonding substrates together comprising the steps of:
(a) coating the prepolymer composition of claim 1 onto a substrate and mating said substrate with a second substrate; and
(b) heating the resulting coating on said substrate to a temperature above about 60° C.

14. The bonded substrates produced by the method of claim 13.

15. A cured polymer comprising the composition of claim 1 which has been heated to a temperature above about 60° C.

16. A one-part, polyurethane, composition curable with heat and having a pot life longer than 5 days at normal ambient temperatures, said composition comprising:
(a) in a continuous fluid phase, an isophorone diisocyanate-capped, generally trifunctional polyester polyurethane prepolymer having a molecular weight in the range of 500–5000;
(b) in a plasticized solid phase uniformly distributed throughout said fluid phase, solid particles of unreacted, unesterified pentaerythritol; wherein the presence of the pentaerythritol reduces the ratio of NCO groups to OH groups in the total composition from greater than 1.5:1 to about 0.8:1 to 1.5:1, and
(c) a catalytic amount of an organometallic or metallic salt catalyst for the reaction between the free hydroxyls of said pentaerythritol and the terminal —NCO radicals of said prepolymer.

17. A polyurethane composition according to claim 16 which is curable at temperatures above 60° C. to a noncellular solid polymer with at least twice the molecular weight of said polyurethane prepolymer, said composition comprising:
(a) in said continuous, substantially 100%-solids fluid phase, a fluid, isophorone diisocyanate-capped poly(epsilon-caprolactone) triol having a molecular weight of 500–3000, the isophorone diisocyanate and the triol having been reacted together at an NCO/OH ratio of from about 2:1 to about 3:1;
(b) in said plasticized solid phase, a moisture-binding agent, pentaerythritol of at least technical grade purity, and a plasticizer which is inert toward hydroxyl groups and isocyanate groups; the amount of said pentaeyrthritol being sufficient to reduce the overall NCO/OH ratio of said composition to the range of about 1:1 to about 1.5:1; and
(c) a catalytic amount of said organo-metallic catalyst.

18. A one-part, isocyanate-capped prepolymer composition stable for at least about 48 hours at normal ambient temperature and pressure and curable at temperatures above 60° C. to a solid polymer with at least twice the molecular weight of said prepolymer, said prepolymer composition comprising:
(a) in a continuous phase, a generally aliphatic or cycloaliphatic isocyanate-capped prepolymer which is fluid at temperatures above 60° C., has a molecular weight in excess of 250, and contains a chain of repeating units selected from the group consisting of oxyalkylene, ester, or mixtures thereof; and, uniformly distributed through said continuous phase, wherein the ratio of NCO groups to hydroxyl groups in the polyisocyanate capped prepolymer is about 0.8:1–3.0:1;
(b) a phase comprising a solid, finely divided polyol of the forumla

wherein
wherein R represents hydrogen or an aliphatic, cycloaliphatic or aromatic acyl radical, provided that more than one of the R groups is hydrogen, and
n is a number ranging from zero to two;
said polyol being at least partially incompatible with said prepolymer at temperatures below about 60° C., wherein sufficient polyol is added to reduce the ratio of NCO groups to OH groups in the total composition by 10 to 75%; and
(c) distributed through said continuous phase, an organometallic or metal salt catalyst for the reaction between isocyanate radicals and the free hydroxyl groups of said component (b).

19. A composition according to claim 18 wherein said uniformly distributed phase consists essentially of the solid, finely divided polyol blended with a plasticizer which is essentially inert toward active hydrogen and isocyanate.

20. A composition according to claim 18 wherein said continuous phase is substantially solvent-free.

21. A composition according to claim 18 wherein:
(a) said prepolymer is the reaction product of the components comprising an aliphatic or cycloaliphatic diisocyanate having —NCO radicals of unequal reactivity and a polyester or polyoxyalkylene polyol, reacted together at an NCO/OH ratio within the range of about 0.8:1 to 3:1; and
(b) said polyol is unesterified, unreacted pentaerythritol or dipentaerythritol.

22. A method according to claim 21 wherein said components of said prepolymer are reacted together at an NCO/OH ratio greater than about 1.5, and the presence of said component (b) reduces the NCO/OH ratio to less than 1.5 but greater than about 0.8.

23. A one-part, polyurethane adhesive curable with heat and having a pot life of more than 48 hours at normal ambient conditions, said adhesive comprising:

(a) in a continuous, fluid phase containing less than 25 weight-% solvent, an isocyanate-capped prepolymer comprising a polyester polyol capped with an aliphatic or cycloaliphatic polyisocyanate, said prepolymer being fluid at 60° C., having an average molecular weight in excess of 500, and having an isocyanate functionality greater than 1 but less than 4;

(b) a sufficient amount of solid particles of unreacted, monomeric or dimeric pentaerythritol or esters of pentaerythritol or its dimer having at least two free hydroxyl groups to reduce the ratio of NCO groups to OH groups in the total composition from about 0.8:1 to 3.0:1 by 10 to 75%, in a plasticized solid phase distributed through said continuous, fluid phase;

(c) distributed through said continuous, fluid phase, an organometallic or metal salt catalyst for the reaction between isocyanate radicals and the free hydroxyl groups of said component (b).

24. An adhesive according to claim 23 wherein said polyester polyol is polycaprolactone glycol, triol, or tetrol, and said pnetaerythritol or its dimer is unesterified; said adhesive containing an organometallic catalyst for the NCO/OH reaction.

25. An adhesive according to claim 24 wherein the molecular weight of the polycaprolactone glycol, triol or tetrol is within the range of 500 to 5000.

26. An adhesive according to claim 24 wherein said aliphatic or cycloaliphatic polyisocyanate is a diisocyanate having one aliphatic —NCO and one cycloaliphatic —NCO.

27. A method for making a heat-curable, one-part, isocyanate-capped prepolymer comprising the steps of:
(a) capping a polyoxyalkylene or polyester-containing polyol with an aliphatic or cycloaliphatic polyisocyanate at an NCO/OH ratio within the range of about 0.8:1 to 3:1, thereby obtaining a isocyanate-capped prepolymer which is fluid at normal ambient temperatures;
(b) uniformly distributing a sufficient amount of a finely divided solid polyol through said prepolymer to reduce the ratio of NCO to OH groups in the total composition by 10 to 75%, said solid polyol being generally incompatible and unreactive with said prepolymer at temperatures below about 60° C., but relatively more reactive with said prepolymer at a range of temperatures above 60° C. and below the decomposition temperature of the prepolymer, said solid polyol having the formula

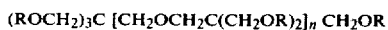

wherein
R represents hydrogen or an aliphatic, cycloaliphatic or aromatic acyl radical, provided that more than one of the R groups is hydrogen, and n is a number ranging from zero to two.

28. A method according to claim 27 wherein said capping step is carried out with (1) a polyester or polyoxyalkylene polyol having a functionality greater than 1 but less than 9, and (2) an aliphatic or cycloaliphatic diisocyanate, wherein said solid polyol is unesterified pentaerythritol; and wherein said unesterified pentaerythritol is blended into said prepolymer with the aid of a liquid plasticizer which is essentially inert toward hydroxyl and isocyanate groups at the lowest curing temperature of said prepolymer.

29. A method for forming a cured polymer film comprising the steps of:
(a) coating the prepolymer composition of claim 35 onto a substrate; and
(b) heating the resulting coating on said substrate to a temperature above about 60° C.

30. A method for bonding substrates together comprising the steps of:
(a) coating the prepolymer composition of claim 1 onto a substrate and mating said substrate with a second substrate; and
(b) heating the resulting coating on said substrate to a temperature above about 60° C.

31. The bonded substrates produced by the method of claim 30.

32. A cured polymer comprising the composition of claim 18 which has been heated to a temperature above about 60° C.

33. A one-part, polyurethane composition curable with heat and having a pot life longer than 5 days at normal ambient temperatures, said composition comprising:
(a) in a continuous, substantially 100% solids phase, an isophorone diisocyanate-capped, generally trifunctional polyester polyurethane prepolymer having a molecular weight in the range of 500-5000;
(b) a sufficient amount of solid particles of unreacted, unesterified pentaerythritol sufficient to reduce the ratio of NCO groups to OH groups in the isocyanate-capped prepolymer of about 0.8:1 to 3.0:1 75%, is a plasticized solid phase uniformly distributed throughout said fluid phase; said
(c) a catalytic amount of an organometallic or metallic salt catalyst for the reaction between the free hydroxyls of said pentaerythritol and the terminal —NCO radicals of said prepolymer.

34. A polyurethane composition according to claim 33 which is curable at temperatures above 60° C. to a noncellular solid polymer with at least twice the molecular weight of said polyurethane prepolymer, said composition comprising:
(a) in said continuous, substantially 100%-solids fluid phase, a fluid, generally isophorone diisocyanate-capped poly(epsilon-caprolactone) triol having a molecular weight of 500-3000, the isophorone diisocyanate and the triol having been reacted together at an NCO/OH ratio of from about 2:1 to about 3:1;
(b) in said plasticized solid phase, a moisture-binding agent, pentaerythritol of at least technical grade purity, and a plasticizer which is inert toward hydroxyl groups and isocyanate groups; the amount of said pentaeyrthritol being sufficient to reduce the overall NCO/OH ratio of said composition by about 10-75; and
(c) a catalytic amount of said organo-metallic catalyst.

* * * * *